United States Patent [19]

Rodriguez-Cavazos et al.

[11] Patent Number: 4,866,525
[45] Date of Patent: Sep. 12, 1989

[54] TELEVISION APPARATUS POWER SUPPLY

[75] Inventors: Enrique Rodriguez-Cavazos, Indianapolis; Steven C. Wetta, Greenwood; Lawrence E. Smith, Indianapolis, all of Ind.; Sammy S. Henig, Secaucus, N.J.

[73] Assignee: Thomson Consumer Electronics, Inc., Princeton, N.J.

[21] Appl. No.: 265,439

[22] Filed: Nov. 1, 1988

[51] Int. Cl.[4] .............................................. H06N 5/63
[52] U.S. Cl. ..................................... 358/190; 315/411
[58] Field of Search ................ 358/190, 243; 315/408, 315/411

[56] References Cited

U.S. PATENT DOCUMENTS

| Re. 29,885 | 1/1979 | Dietz | 315/408 |
| 4,147,964 | 4/1979 | Luz et al. | 315/411 |
| 4,232,254 | 11/1980 | Haferl | 315/408 |
| 4,321,514 | 3/1982 | Thibodeau et al. | 358/190 |
| 4,651,214 | 3/1987 | Rodriguez-Cavazos | 358/190 |
| 4,812,719 | 3/1989 | Stephens et al. | 358/190 |

FOREIGN PATENT DOCUMENTS 5932261 2/1981 Japan.

OTHER PUBLICATIONS

Television service data manual for CTC 85 chassis series entitled, "Chassis CTC 85 Series," dated 1977, published by RCA Corporation Consumer Electronics Technical Publications Department.

Primary Examiner—John K. Peng
Attorney, Agent, or Firm—Joseph S. Tripoli; Joseph J. Laks; Sammy S. Henig

[57] ABSTRACT

An SCR switch of a switch mode power supply is coupled between an unregulated supply voltage and a filter capacitor. A regulator oscillator generates trigger pulses for controlling a switching operation of the SCR switch of the power supply to produce an output supply voltage that energizes a deflection circuit. The regulator oscillator produces trigger pulses that are applied to the SCR switch during both power-up and power-off operation. A resistor coupled between the unregulated supply voltage and the filter capacitor maintains the filter capacitor charged during power-off operation to prevent the trigger pulses from causing the latching operation in the SCR switch throughout the power-off operation. In this way, an audible parasitic vibration sound is not being generated by the power supply during the power-off operation.

8 Claims, 3 Drawing Sheets

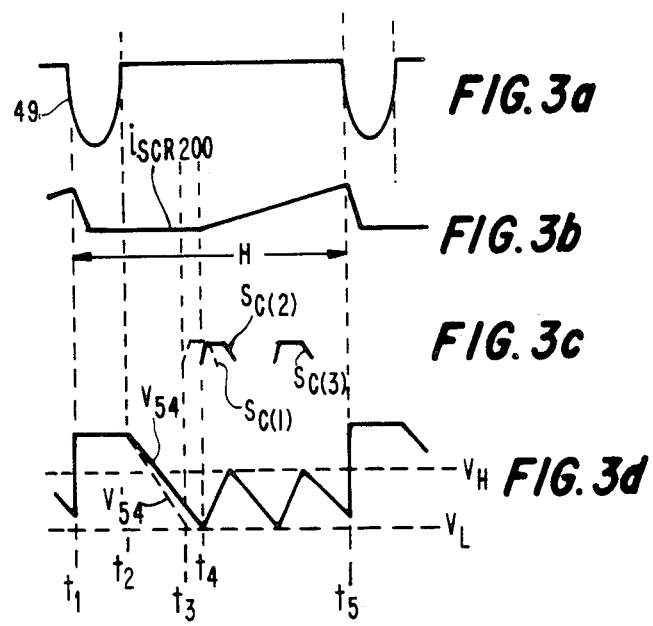
FIG. 3a
FIG. 3b
FIG. 3c
FIG. 3d
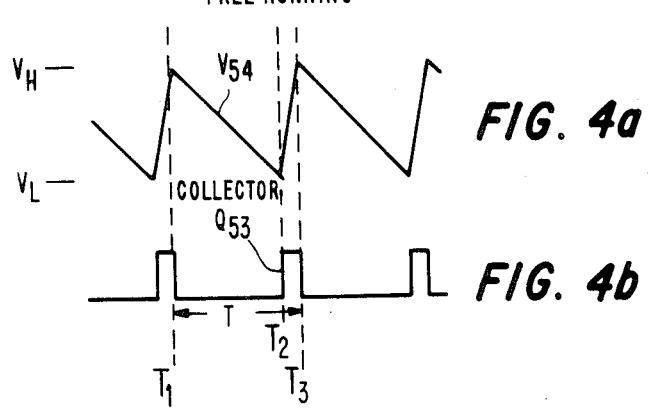
FIG. 4a
FIG. 4b

TELEVISION APPARATUS POWER SUPPLY

The invention relates to a switching regulator power supply of a television apparatus.

A typical deflection circuit output stage of a television receiver includes a retrace resonant circuit, including a deflection winding and a linearity inductance, and a transitor switch. The output stage generates, in a secondary winding of a flyback transformer, a retrace pulse that is rectified for generating a power-up or run supply voltage for energizing the receiver circuitry. The output stage is energized by a B+ supply voltage that is coupled to a terminal of a primary winding of the flyback transformer. The B+ supply voltage is produced and regulated in a switching regulator. The switching regulator includes a switch such as, for example, an SCR switch having an input terminal that is coupled to an unregulated supply voltage.

During normal power-up operation, the SCR switch is conductive from an instant that is controllable, occurring within each trace interval of a horizontal deflection cycle, and remains latched in a conductive state during the remaining part of trace. During retrace, the SCR switch is turned off in preparation for the following regulation cycle.

Regulated B+ supply voltage is developed in a filter capacitor that is coupled via a filter inductance to an output terminal of the SCR switch. The filter capacitor supplies a load current that flows in the deflection circuit output stage during power-up operation. A control circuit of the regulator that includes an oscillator provides, in a given cycle of a first control signal, a trigger pulse that varies the instant when the SCR switch becomes conductive. The trigger pulse occurs at an instant that is controlled in accordance with the B+ supply voltage in a negative feedback manner such that the B+ supply voltage is maintained regulated.

A turn-off winding of the flyback transformer, coupled between the unregulated supply voltage and the anode of the SCR, couples a retrace pulse to the anode of the SCR switch during each horizontal retrace interval to turn off the SCR switch during retrace. Thus, the oscillator of the control circuit is synchronized during the power-up operation by the retrace pulse. During a power-off operation the oscillator free runs. During the power-up operation, the timing of the trigger pulse that is produced by the oscillator varies in accordance with the B+ supply voltage in a negative feedback manner.

In a power supply, embodying a feature of the invention, the control circuit is energized during both the power-up and power-off operations so as to obviate the need for switching off the unregulated supply voltage via an on/off power switch. On the other hand, a horizontal rate drive signal, provided to the deflection circuit output stage from a horizontal drive stage, ceases to occur during the power-off operation. Consequently, the generation of the deflection current and of the retrace pulses is prevented. The result is that the load current supplied from the filter capacitor is substantially reduced during the power-off operation.

As explained before, the trigger pulses occur at a free running frequency, during the power-off operation. Any trigger pulse that occurs when the anode-to-cathode voltage of the SCR is insufficiently large to enable latching operation in the SCR switch, will, nevertheless, cause the SCR switch to be turned on in an unlatched mode of operation for an interval that is proportional to the pulse width of the trigger pulse. Assuming a constant width of the trigger pulse, it follows that in the unlatched mode of operation of the SCR switch the average current through the SCR switch in each period of the trigger pulses is directly related to the free running frequency of the trigger pulses. This is so because the duty cycle of the SCR switch is directly related to the frequency of the trigger pulses.

Assume that, during the power-off operation, the frequency or the duty cycle of the trigger pulses is at such a low value that the average current in the SCR switch in each period of the trigger pulses is smaller than the load current. Further assume that the load current is supplied entirely through the SCR switch. Therefore, the filter capacitor will discharge in each period of the trigger pulses by the small load current until attaining a level that will produce a sufficiently large anode-to-cathode voltage difference in the SCR switch for enabling the latching operation. Thereafter, the SCR switch will be triggered by the next trigger pulse of the free running oscillator and the latching operation will occur in the SCR switch.

Because the load current is small, the discharge time for obtaining such sufficiently large anode-to-cathode voltage difference that enables the latching operation might be equal to, for example, 160 miliseconds. Because retrace pulses are not present, during power-off operation, such latching operation will continue until the filter capacitor is again charged to a voltage that is equal to or greater than the unregulated supply voltage, causing the SCR switch to turn off. After the end of each latching operation and until such interval of 160 miliseconds will have elapsed the anode-to-cathode voltage of the SCR switch is again too small to enable the next latching operation.

During the latching operation, a high amplitude, wide pulse of current flowing in the SCR switch and, for example, in the filter inductance might be produced that is repetitive at a corresponding frequency of approximately 6 Hz. Such wide current pulses might produce an objectionable sound during power-off operation. The objectionable sound might be produced due to possible parasitic mechanical vibrations as a result of the wide pulse current in, for example, the inductance of the filter. Therefore, it may be desirable to prevent the filter capacitor from being discharged to a level that enables the undesirable latching operation in the SCR switch to occur, during the power-off operation.

In accordance with an aspect of the invention, a resistor is coupled from the unregulated supply voltage to the filter capacitor. The resistor supplies a sufficiently large current to the filter capacitor that maintains the filter capacitor voltage substantially at the same level at the end of each trigger pulse. Such level is sufficiently high to maintain the anode-to-cathode voltage of the SCR switch sufficiently low for preventing the latching operation of the SCR switch throughout the power-off operation. The result is that, advantageously, the aforementioned objectionable sound is eliminated.

In accordance with an aspect of the invention, a switch mode power supply of a television apparatus includes a source of an input supply voltage and a filter capacitor for developing therein an output supply voltage. A load is coupled to the filter capacitor for producing a load current that is developed from a charge removed from the filter capacitor. A periodic switching first control signal is generated during both power-on and power-off modes of operation of the power supply.

The periodic switching first control signal is coupled to a control terminal of the regulator switch during both modes of operation. The regulator switch has a main current conducting input terminal coupled to the input supply voltage and energized thereby during both modes of operation and has a main current conducting output terminal coupled to the filter capacitor. A switching current is produced in the regulator switch and is coupled to the filter capacitor to produce in the filter capacitor a first current that replenishes the removed charge and that develops an output supply voltage in the filter capacitor. The output supply voltage is coupled to the output terminal of the regulator switch to produce a voltage difference between the input and output terminals of the regulator switch. The regulator switch is capable of operating in a latched conductive state in a given period of the first control signal, provided the voltage difference is outside a first range of values. The voltage difference is established to be outside the first range of values, during the power-on mode of operation for enabling the regulator switch to periodically operate in the latched conductive state, during the power-on mode of operation. The voltage difference is established to be inside the first range of values during the power-off operation, for preventing the regulator switch from operating in the latched conductive state, throughout the power-off mode of operation.

FIGS. 3a–3d illustrate waveforms useful in explaining the normal power-up operation of the circuits of FIG. 1 and 2; and FIGS. 4a–4b illustrate free running operation of the oscillator of the control circuit of FIG. 2.

Figure 1:
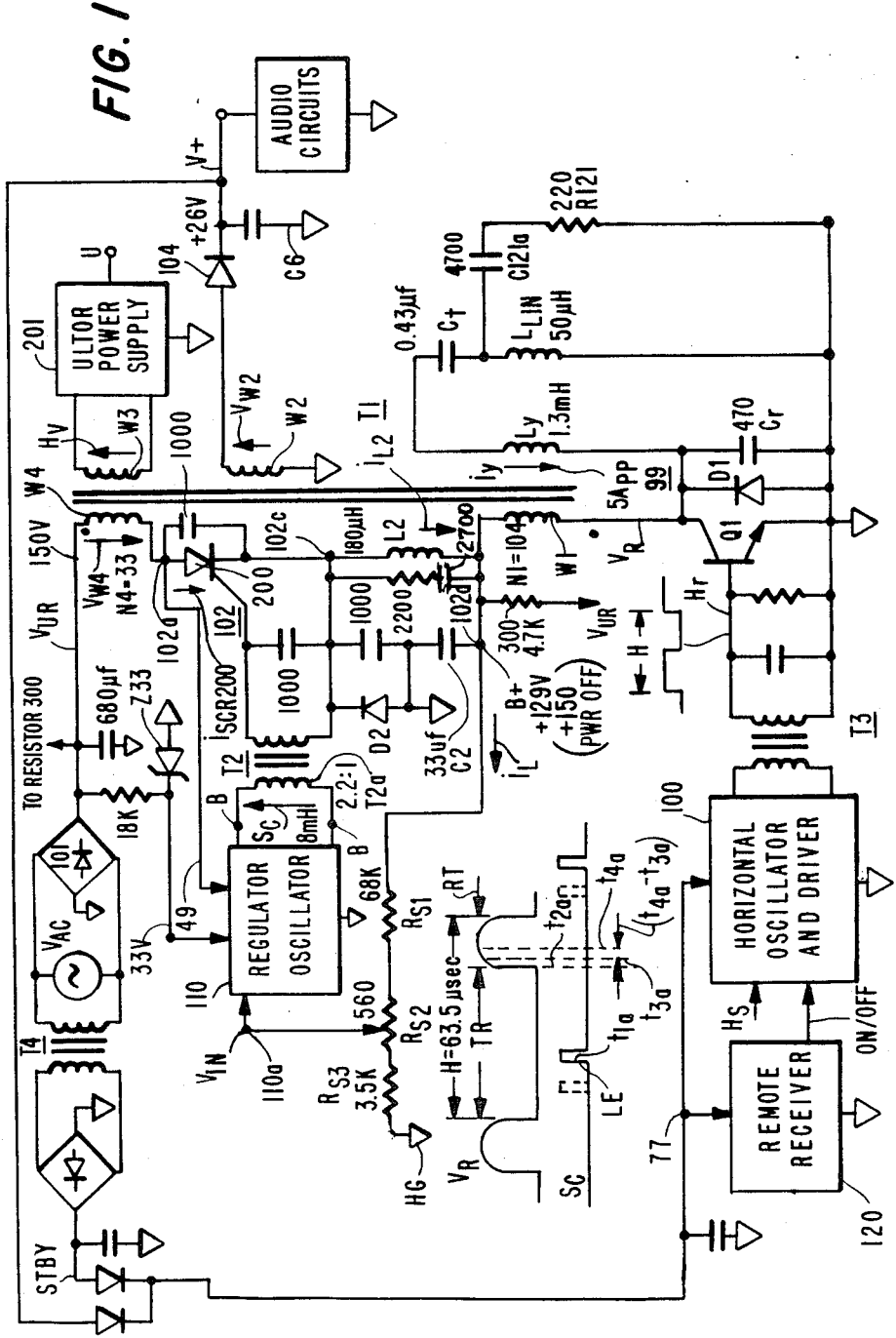
FIG. 1 illustrates a television power supply including a supply regulator embodying the invention.

FIG. 1 illustrates a portion of a television receiver incorporating a bridge rectifier 101 that rectifies a mains supply volta $V_{AC}$ to produce a DC, unregulated voltage $V_{UR}$. An output stage, or switch regulator 102, that includes a silicon controlled rectifier (SCR) switch, referred to herein as SCR 200, produces a regulated voltage B+ that is coupled to a winding W1 of a flyback transformer T1. An input terminal 102a of regulator 102 is coupled to unregulated voltage $V_{UR}$. Regulated voltage B+ is developed at an output terminal 102d of switch regulator 102. Transformer T1 is coupled to a collector electrode of a deflection switching transistor Q1 of a horizontal circuit output stage 99 operating at a horizontal rate $f_H$. A control signal $H_r$, at the horizontal rate $f_H$, is developed at the base of transistor Q1, during a power-up operation. Signal $H_r$ is applied from a control circuit, referred to herein as a horizontal oscillator and driver 100 that is coupled to the base electrode of transistor Q1. Signal $H_r$ controls the switching of transistor Q1 for generating a deflection current $i_y$ in a series arrangement of a deflection winding $L_Y$, a trace capacitor $c_t$ and a linearity inductor $L_{LIN}$ of output stage 99. A retrace voltage $V_{w2}$ is produced in a conventional manner across a secondary winding W2 of transformer T1 in each retrace interval of each horizontal period H. Each retrace interval occurs immediately after transistor Q1 becomes nonconductive. A DC, run-mode supply voltage V+, that is, illustratively, +26 volts, is produced by rectifying voltage $V_{w2}$ in a rectifier arrangement 104 that is coupled to winding W2. Voltage V+ is coupled to various circuits of the receiver, not shown, to provide them with a run supply voltage, during power-up operation.

Voltage B+ is coupled via a voltage divider, including resistor $R_{s1}$, $R_{s2}$ and $R_{s3}$, to a control circuit 110 that is also referred to herein as regulator oscillator 110 that is energized during both power-up and power-off operations to provide a feedback voltage $V_{IN}$ at a terminal 110a. During power-up operation, control circuit 110 generates a signal $S_c$ at the horizontal rate $f_H$ and at a controllable phase that controls the instant, in each horizontal interval H, in which SCR 200 becomes conductive. The phase of signal $S_c$ varies in accordance with a difference between voltage $V_{IN}$, that is proportional to voltage B+, and a reference voltage, not shown in FIG. 1, that is produced in control circuit 110. The regulation provided by signal $S_c$ causes regulated voltage B+ to be at a predetermined DC voltage level such as, illustratively, +129 volts, during power-up operation.

The anode of SCR 200 is coupled to unregulated voltage $V_{UR}$ via a winding W4 of transformer T1. The cathode of SCR 200 is coupled to an end terminal 102c of a filter inductor L2. Terminal 102d, the other end terminal of inductor L2 where regulated voltage B+ is developed, is coupled to winding W1 of flyback transformer T1. A filter capacitor C2 is coupled to terminal 102d. Signal $S_c$ is coupled via a driver transformer T2 to the gate electrode of SCR 200.

When a leading edge LE of signal $S_c$ of FIG. 1, having a controllable phase as shown in the waveform of FIG. 1, occurs, SCR 200 is triggered and becomes immediately conductive. During normal power-up operation, leading edge LE occurs at a time $t_{1a}$ during a trace interval of each period H of a voltage $V_{W4}$ that is developed across winding W4. During the interval in which SCR 200 is conductive, a current $i_{L2}$ in inductor $i_{L2}$, that charge capacitor C2, increases. The rate of increase of current $i_{L2}$ is determined by unregulated voltage $V_{UR}$ and by regulated voltage B+.

At the end of horizontal trace, a time $t_{2a}$, shown in the waveform of FIG. 1, a retrace pulse portion of voltage $V_{W4}$ is developed. Voltage $V_{W4}$ is developed by a transformer action from volta $V_R$ in retrace capacitor $C_r$. Retrace pulse $V_{W4}$ in winding W4 is poled in such a manner as to lend to reverse bias SCR 200 and to reduce the corresponding currents flowing in inductor L2. As a result of the negative rate of change of current $i_{L2}$ in inductor $L_2$, a voltage developed at terminal 102c is decreased until a time $t_{3a}$ of retrace pulse portion RT when a catch diode D2 that is coupled to terminal 102c becomes conductive. The operation of a diode such as catch diode D2 is described in detail in U.S. Pat. No. 4,163,926, entitled SWITCH REGULATOR FOR A TELEVISION APPARATUS, in the name of D. H. Willis, that is incorporated by reference herein.

Figure 2:
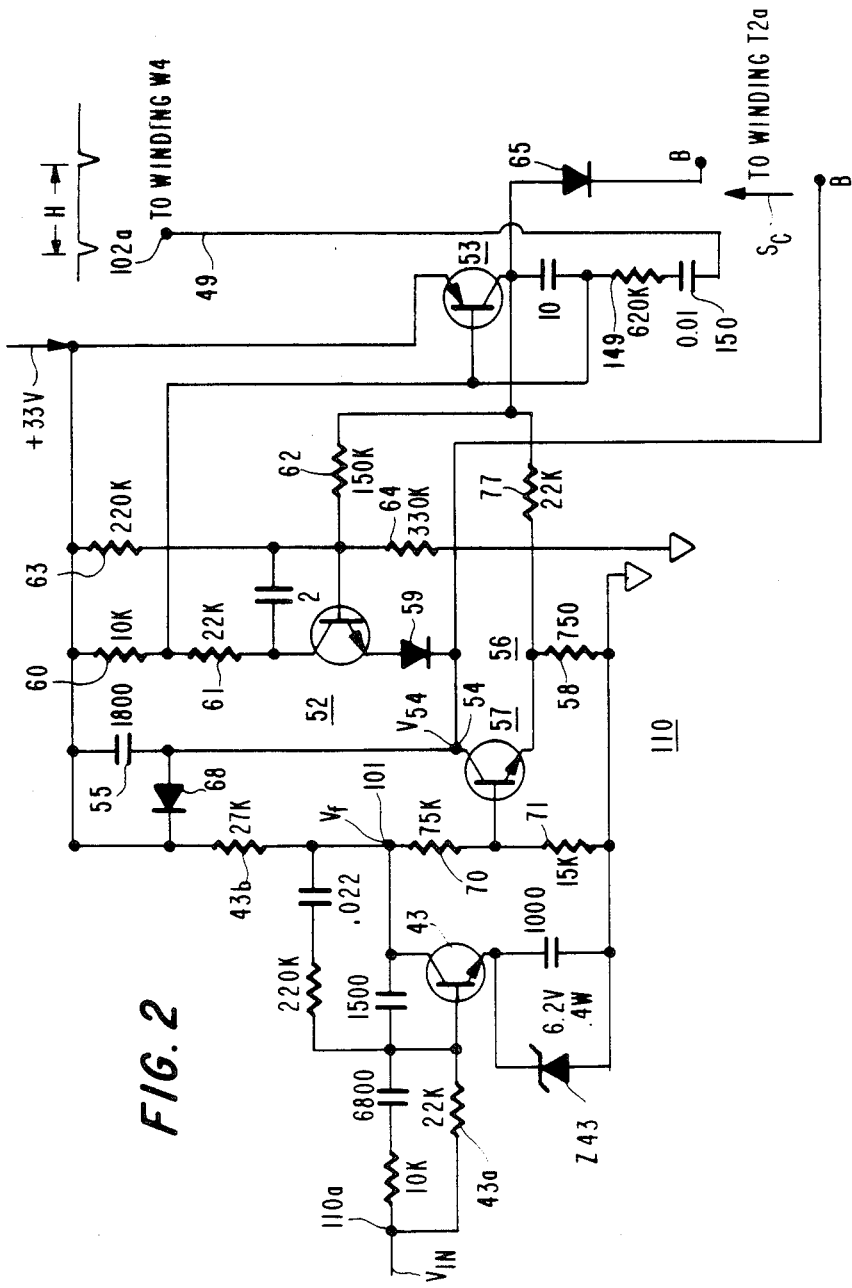
FIG. 2 illustrates the control circuit of the supply regulator of FIG. 1 that includes an oscillator.

FIG. 2 illustrates a detail schematic diagram of regulator oscillator or SCR control circuit 110 of FIG. 1. Similar numerals and symbols in FIGS. 1 and 2 indicate similar items or functions. During normal power-up operation, control circuit or regulator oscillator 110 of FIG. 2 is synchronized by a retrace signal 49 developed at terminal 102a of SCR 200 of FIG. 1 from voltage $V_{W4}$. During shut-down or power-off operation, regulator oscillator 110 operates continuously as a free running oscillator and generates signal $S_c$, as described later on.

Both PNP transistor 53 of FIG. 2 and NPN transistor 52 switch states at a rate established by trip level voltages for a control terminal 54. Control terminal 54 is coupled to the emitter of transistor 52 through a diode 59. A charging capacitor 55 that is coupled to a regulated +33 volt source is charged through a controllable current source 56 comprising a transistor 57 and a resistor 58, coupled in series. The junction of the capacitor 55 and the collector of transistor 57 form control terminal 54 that was mentioned before. The +33 volt source is produced across a zener diode Z33 during both power-up and power-off operations.

Complementary transistors 52 and 53 are coupled together in a latching arrangement. That is, the collector output terminal of transistor 53 is coupled to the base input terminal of transistor 52, and the collector output terminal of transistor 52 is coupled to the base input terminal of transistor 53, both transistors thereby forming a regenerative latch.

Under continuous free-running oscillator conditions of regulator oscillator 110 that occur during power-off operation, as explained later on, when transistor 52 becomes conductive, current is drawn from the +33 volt source to the collector of transistor 52 through resistors 60 and 61, thereby turning on transistor 53. Part of the collector current of transistor 53 is then coupled to the base transistor 52 through a resistor 62, thereby regeneratively turning on both transistors into saturated conduction. Similarly, when transistor 52 becomes nonconductive, both transistors regeneratively turn off.

Operation of regulator oscillator 110 for one free-running cycle will now be described. Consider an interval during which transistors 52 and 53 are nonconducting. The voltage at the base of the transistor 52 is determined by the resistance values of a voltage divider comprising resistor 63 in series with the parallel combination of resistors 64 and 62. This base voltage establishes a two-diode drop less a lower level trip voltage $V_L$ for control terminal 54. Should voltage $V_{54}$ at terminal 54 decrease below level $V_L$, transistors 52 and 53 would regeneratively turn on.

When both transistors 52 and 53 are conductive, the voltage divider ratio changes. With transistor 53 in saturated conduction, resistor 63, rather than resistor 64, is now effectively paralleled by resistor 62, developing a new, more positive base voltage for transistor 52 and establishing a two-diode drop less upper level trip voltage $V_H$ for control terminal 54. Should voltage $V_{54}$ at terminal 54 increase above level $V_H$, transistors 52 and 53 would regeneratively turn off.

FIGS. 4a and 4b illustrate idealized waveforms for voltage $V_{54}$ at control terminal 54 and the collector voltage of oscillator transistor 53 during continuous free-running operation of regulator oscillator 110 that occurs during power-off operation of the power supply. During power-off operation, regulator oscillator 110 of FIG. 1 is energized but deflection circuit output stage 99 is disabled. Consider voltage $V_{54}$ of FIG. 2 during the interval, beginning somewhat after time $T_1$. Transistors 52 and 53 are turned off, and capacitor 55 is charging from the +33 volt source at a constant rate determined by the base voltage of transitor 57 of controllable current source 56. The voltage at terminal 54 is thus a decreasing sawtooth. At time $T_2$, voltage $V_{54}$ has decreased to its lower trip voltage level $V_L$. Subsequently, transistors 52 and 53 regeneratively turn on.

The collector of transistor 53 is coupled to one of output terminals B—B through a diode 65. A primary winding T2a of transformer T2 of FIG. 1 is coupled between terminals B—B. A discharge path of capacitor 55 comprises the terminal of capacitor 55 coupled to the +33 volt source, the emitter-collector path of transistor 53, diode 65, winding T2a coupled across terminals B—B and the other terminal of capacitor 55. To prevent current source 56 from undesirably charging capacitor 55 during the capacitor discharging interval, the collector of transistor 53 is coupled to the emitter of transistor 57 through a resistor 77. When transistor 53 conducts, transistor 57 is cut off, disabling current source 56 during the discharge interval.

As illustrated in FIG. 4a, beginning at time $T_2$, voltage $V_{54}$ at terminal 54 comprises an increasing sawtooth. At time $T_3$, voltage $V_{54}$ has increased to its upper trip voltage level $V_H$. Transistors 52 and 53 regeneratively turn-off, and the next charging cycle begins.

As represented by the collector voltage of transistor 53, illustarted in FIG. 4b, during the approximate interval $T_2$-$T_3$, an output signal is coupled to regulator oscilator 110 output terminals B—B to provide gating current to turn-on the regulator SCR 200 of FIG. 1. The actual time width of interval $T_2$-$T_3$ of FIGS. 4a–4b is relatively unimportant provided sufficient SCR gating current of a sufficient duration is coupled to SRC 200 of FIG. 1 to turn it on.

In normal power-up operation, regulator oscillator 110 is not left continuously free-running as in power-off operation but is synchronized with horizontal deflection. The charging rate of capacitor 55 of FIG. 2 is varied depending upon the magnitude of the feedback voltage $V_f$ coupled to a feedback terminal 101 for varying the turn-on instant and conduction angle of SCR 200 of FIG. 1.

FIGS. 3a–3d illustrate waveforms useful for explaining normal power-up operation of control circuit 110 of FIGS. 1 and 2. Similar numerals and symbols in FIGS. 1, 2 and 3a–3d indicate similar items or functions.

At the beginning of the retrace interval at time $t_1$ of FIGS. 3a, negative going retrace pulse 49 of FIG. 2 is coupled from terminal 102a to the base electrode of transistor 53 through a resistor 149 and a capacitor 150 that causes transistor 53 to become conductive. Therefore, capacitor 55 becomes immediately afterward substantially discharged.

After time $t_2$, the beginning of trace, capacitor 55 begins to charge at a rate determined by the voltage at the base of transistor 57 of current source 56. Voltage $V_{54}$ decreases until lower trip voltage $V_L$ is reached at time $t_4$. At time $t_4$, the oscillator transistors regeneratively turn on, resulting in a gating signal $S_{c(2)}$ being generated and coupled to SCR 200 to turn on the SCR, as illustrated in FIG. 3c.

Regulator oscillator 110 then continues in a free-running mode and, as illustrated in FIG. 3d, several charge-discharge cycles may occur before another synchronizing retrace pulse 49 is coupled to terminal 102a at time $t_5$. In this way, the free-running mode, unlike in the power-off operation, is interrupted by synchronizing retrace pulse 49. Thus, as illustrated in FIG. 3c, in the subsequent free-running mode after time $t_4$, and prior to the next retrace pulse 49, another SCR 200 gating signal $S_c$ may be coupled to the SCR. The number of additional gating signals will depend upon such factors as the position of the turn-on instant $t_4$ within the horizontal trace interval and the charging and discharging rates established for capacitor 55. Such additional turn-on gating signals are of relatively little consequence, since the SCR remains in a conductive state as long as the current through the SCR is above its holding current level.

To provide regulation, the turn-on instant $t_4$ is varied within the trace interval by varying the charge rate of capacitor 55 through a varying voltage at the base of transistor 57. Transistor 57 base voltage is the proportioned value of feedback voltage $V_f$ coupled to the base of transistor 57 through a voltage divider comprising resistors 70 and 71.

An error amplifying transistor 43 has a base electrode that is coupled to feedback signal $V_{IN}$ that is representative of voltage B+ via an input resistor 43a. Collective load resistors 43b, 70 and 71 form a load resistance at the collector of transistor 43. A zener diode Z43 that is coupled to the emitter of transistor 43 determines the threshold voltage of the inverting amplifier that includes transistor 43. Amplified error voltage $V_f$ that is developed at a terminal 101, at the collector of transistor 43, is coupled to the base electrode of transistor 57.

After time $t_2$, the beginning of trace, capacitor 55 begins to charge at a rate determined by the voltage at the base of transistor 57 of current source 56. The voltage $V_{54}$ decreases until the lower trip voltage $V_L$ is reached at time $t_4$. At time $t_4$, the oscillator transistors regeneratively turn on, resulting in gating signal $S_{c(2)}$ being coupled to SCR 200 to turn the SCR on, as illustrated in FIG. 3c.

Should the regulated B+ voltage at terminal 102d of FIG. 1 decrease, for example, the inverted feedback voltage $V_f$ of FIG. 2 increases causing the base voltage of transistor 57 to also increase. The current magnitude of current source 56 increases, increasing the charge rate of capacitor 55. As illustrated in FIGS. 3d and 3e by the dotted waveforms $V_{54}$ and $S_{c(1)}$, the lower trip voltage level $V_L$ is reached at an earlier instant $t_3$, generating a gating pulse $S_{c(1)}$ at the earlier instant $t_3$, as required for proper regulation.

A user initiated command to enable shut-down or power-off operation of the television receiver causes remote receiver 120 of FIG. 1 to generate an on/off control signal ON/OFF at an "OFF" state that is applied to driver 100. After power-off command occurs, the operation of signal on/off causes switching signal $H_r$ at the base electrode of transistor Q1 to be removed. Therefore, output stage 99 is disabled and supply voltage V+ is not generated. Also, retrace pulse $V_{W4}$ in winding W4 of transformer T1 is not generated. Consequently, synchronizing signal 49 that, in normal power-up operation, synchronizes regulator oscillator 110 is not generated during the power-off operation that follows. Because regulator oscillator 110 is energized from voltage $V_{UR}$ also during the power-off operation, regulator oscillator 110 free runs continuously, as described before.

Assume that, in a given interval that occurs during the power-off operation, the magnitude of the anode-to-cathode voltage of SCR 200 is smaller that the minimum required for enabling latching operation in SCR 200. In this case, any trigger pulse of free running control signal $S_c$ that occurs when the anode-to-cathode voltage of SCR 200 is insufficiently large to enable latching operation in SCR 200, will, nevertheless, cause SCR 200 to turn on in an unlatched mode. In each such period of signal $S_c$, SCR 200 will be turned on for an interval that is proportional to the pulse width of the trigger pulse or, for example, to interval $T_2-T_3$ of FIG. 4b. The pulse width of each trigger pulse is constant. It follows that for a given anode-to-cathode voltage difference in SCR 200 of FIG. 1 operating in the turned-on unlatched operation, the average value of current $i_{SCR200}$ through SCR 200 in each period T of FIG. 4b of the trigger pulses of signal $S_c$ of FIG. 1 is directly related to the frequency of the trigger pulses. This is so because the duty cycle of SCR 200 is direclty related to the frequency of the trigger pulses.

Further assume that, in the aforementioned given interval during the power-off operation, the free running frequency of the trigger pulses is so low that the average value of current $i_{SCR200}$ in SCR 200 in each period of the trigger pulses is smaller than a load current $i_L$ in resistor $R_{S1}$. Additionally, assume that the load current $i_L$ is supplied entirely through SCR 200. Therefore, filter capacitor C2 would discharge by load current $i_L$ until attaining a voltage level that produces a sufficiently large anode-to-cathode voltage difference in SCR 200, such as 10 volts, for enabling the latching operation. Thereafter, SCR 200 will be triggered by the next trigger pulse produced by free running oscillator 110 and the latching operation will occur in SCR 200.

Because load current $i_L$ is small, the discharge interval for obtaining such sufficiently large anode-to-cathode voltage difference that enables the latching operation in SRC 200 may be equal to, for example, 160 milliseconds. Since retrace pulses $V_{W4}$ are not present, during the power-off operation, such latching operation will continue until filter capacitor C2 is again charged to a voltage that is equal to or greater from unregulated supply voltage $V_{UR}$, causing the SCR 200 to turn off. At the end of each such latching operation, the anode-to-cathode voltage of SCR 200 is again insufficiently large to permit the next latching operation until the next interval of 160 milliseconds has elapsed.

The latching operation might produce a high amplitude, wide pulse of current $i_{SCR200}$ flowing in SCR 200 and in filter inductor L2 that is repetitive at a corresponding frequency of approximately 6 Hz. Such wide current pulses might produce an objectionable sound during power-off operation. The objectionable sound might be produced due to possible parasitic mechanical vibrations as a result of the wide pulses current in, for example, inductor L2. Such sound may be objectionable if it occurs during the power-off operation when the user does not expect any sound to come from the turned-off television receiver. Therefore, it may be desirable to prevent filter capacitor C2 from being discharged to a level that enables the undesirable latching operation in the SCR 200, during the power-off operation.

In accordance with an aspect of the invention, a resistor 300 is coupled from unregulated supply voltage $V_{UR}$ to terminal 102d of capacitor C2. Resistor 300 supplies a current to capacitor C2 that is proportional to load current $i_L$. The current flowing in resistor 300 causes voltage B+ in filter capacitor C2 to be maintained substantially at the same level at the end of each trigger pulse. The DC cathode voltage of SRC 200 that is equal to voltage B+ is maintained at a sufficiently high level such that the anode-to-cathode voltage of SCR 200 is sufficiently low for preventing the latching operation of the SCR switch from ever occuring throughout the power-off operation. The result is that, advantageously, the aforementioned objectionable sound is eliminated, as explained in detail in U.S. patent application Ser. No. 265,846 entitled A Voltage Regulator In A Television Apparatus, in the names of Curt Stephens et al., filed concurrently herewith and incorporated by reference herein.

During power-up operation, the power dissipation in resistor 300 is directly related to the square of the difference between voltage $V_{UR}$ and voltage B+. It may be preferable to couple resistor 300 to terminal 102c, instead of to terminal 102d, for reducing the power dissipation in resistor 300.

What is claimed is:

1. A switch mode power supply of a television apparatus, comprising:
    a source of an input supply voltage;
    a filter capacitor for developing therein an output supply voltage;
    a load coupled to said filter capacitor for producing a load current that is developed from a charge removed from said filter capacitor;
    means for generating a periodic switching first control signal during both power-on and power-off modes of operation of said power supply;
    a regulator switch having said periodic switching first control signal coupled to a control terminal thereof during both modes of operation and having a main current conducting input terminal coupled to said input supply voltage and energized thereby during both modes of operation and having a main current conducting output terminal coupled to said filter capacitor for producing in said regulator switch a switching current that is coupled to said filter capacitor to produce in said filter capacitor a first current that replenishes said removed charge and that develops an output supply voltage in said filter capacitor that is coupled to said output terminal of said regulator switch to produce a voltage difference between said input and output terminals of said regulator switch, said regulator switch being capable of operating in a latched conductive state in a given period of said first control signal, provided said voltage difference is outside a first range of values; and
    means coupled to said filter capacitor for controlling said voltage difference during both modes of operation, said voltage difference controlling means establishing said voltage difference to be outside said first range of values during said power-on mode of operation for enabling said regulator switch to periodically operate in said latched conductive state during said power-on mode of operation, and establishing said voltage difference to be inside said first range of values during said power-off operation for preventing said regulator switch from operating in said latched conductive state throughout said power-off mode of operation.

2. A power supply according to claim 1 wherein said voltage difference controlling means comprises a resistor coupled to said filter capacitor to produce at least a portion of said first current in a current path that bypasses said regulator switch.

3. A power supply according to claim 1 wherein said voltage difference controlling means comprises a resistor having a first terminal that is coupled to receive said input supply voltage and a second terminal that is coupled to said filter capacitor to form a current path that is separated from said regulator switch.

4. A power supply according to claim 1 further comprising, means for generating an input signal at a frequency that is related to a deflection frequency during said power-up mode of operation, and a deflection circuit output stage having a deflection switch that is responsive to said input signal and that switches at a frequency that is related to that of said input signal for producing in said output stage a second control signal at a frequency that is related to that of said input signal during said power-up mode of operation, said second control signal being coupled to one of said input and output terminals of said regulator switch to turn off said regulator switch in each period of said first control signal such that throughout said power-off operation said second control signal is disabled.

5. A power supply according to claim 4 wherein said load comprises a primary winding of a flyback transformer that is included in said deflection circuit output stage, said primary winding being coupled to said output supply voltage and energized thereby during said power-up mode of operation and drawing substantially no load current during said power-off mode of operation when no switching operation occurs in said deflection switch.

6. A power supply according to claim 4 wherein said input signal is at a horizontal rate during said power-up operation and wherein said second control signal is coupled through a flyback transformer winding of said output stage to said regulator switch.

7. A power supply according to claim 4 wherein said first control signal generating means comprises a regulator oscillator that is synchronized to said input signal during said power-up operation and free runs during said power-off operation.

8. A power supply according to claim 1 wherein said regulator switch comprises a silicon controlled rectifier (SCR) and wherein a periodic second control signal is developed in a transformer turn-off winding that is coupled in series with said SCR.

* * * * *